Jan. 23, 1968
H. D. HÖLSCHER  3,365,717
METHOD OF AND APPARATUS FOR PROVIDING A MEASURE OF
THE DISTANCE BETWEEN TWO SPACED POINTS
Filed Aug. 30, 1966
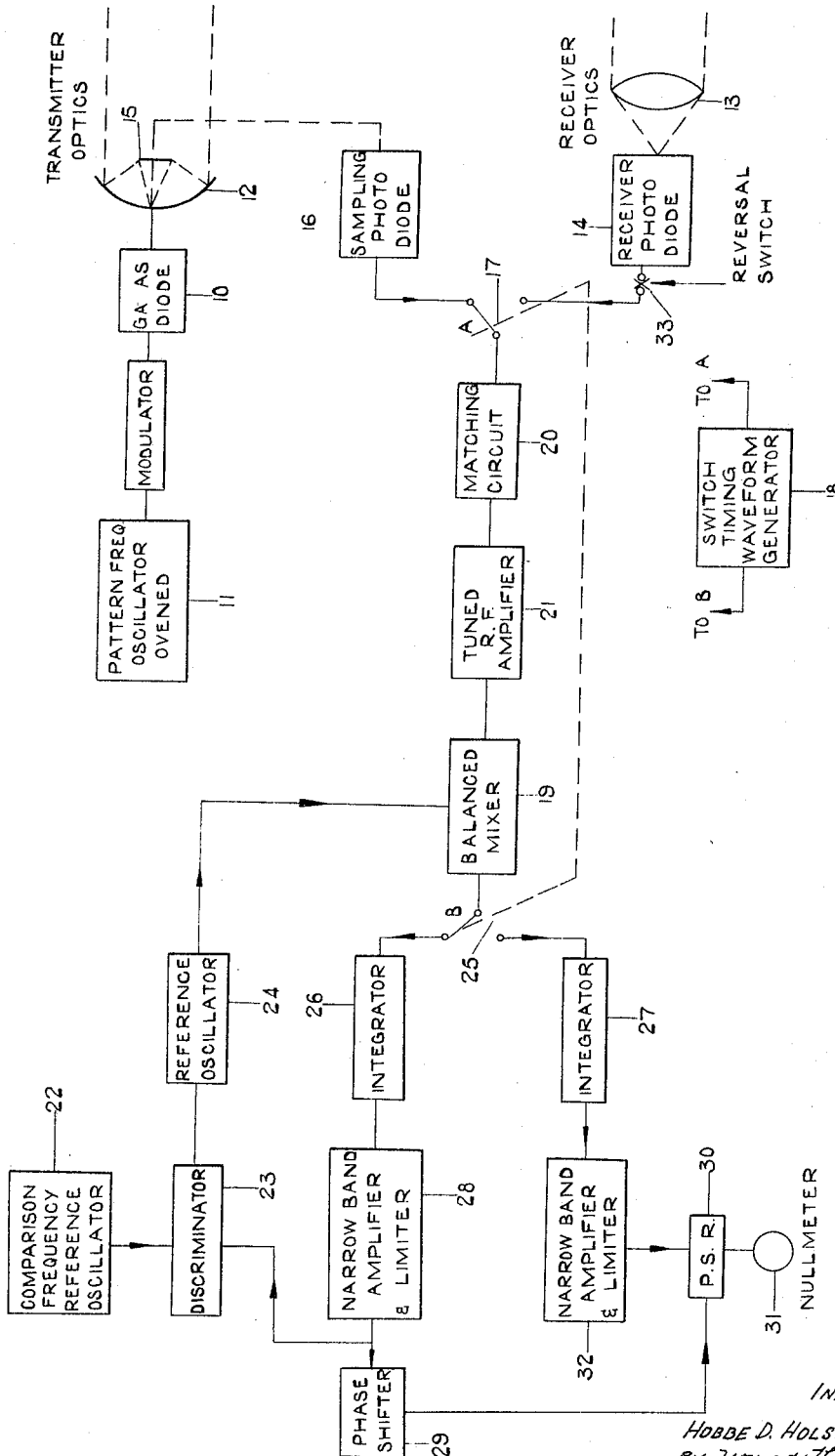
INVENTOR
HOBBE D. HOLSCHER
BY Young + Thompson
ATTYS.

United States Patent Office 3,365,717
Patented Jan. 23, 1968

3,365,717
METHOD OF AND APPARATUS FOR PROVIDING A MEASURE OF THE DISTANCE BETWEEN TWO SPACED POINTS
Hobbe D. Hölscher, Johannesburg, Transvaal, Republic of South Africa assignor to South African Inventions Development Corporation, Pretoria, Transvaal, Republic of South Africa
Filed Aug. 30, 1966, Ser. No. 576,062
Claims priority, application Republic of South Africa, Sept. 3, 1965, 4,819/65
16 Claims. (Cl. 343—12)

ABSTRACT OF THE DISCLOSURE

Electronic apparatus for measuring the distance between two spaced points, in which a measuring frequency is modulated on a carrier frequency having a wavelength in the range 100 to 0.1 microns. The modulated carrier frequency is transmitted from a master to a remote point and the modulated carrier frequency is simply reflected back to the master point. The outgoing and incoming modulated carrier frequencies are demodulated at the master point and the two measuring frequencies thus obtained are mixed with a reference frequency, which is generated at the master point, to provide two comparison frequencies. The phases of the comparison frequencies are then compared to provide the necessary distance information.

---

This invention relates to electronic distance measuring apparatus for providing a relative measure of the distance between two spaced points.

At the present time electronic distance measuring apparatus can be grouped in two categories: one in which the carrier frequencies are in the microwave region of the frequency spectrum and one in which the carrier frequencies are in the light region. With instruments falling into the first category, it is necessary that the carrier frequency being transmitted to the second point be different to the carrier frequency being returned to the first point, to prevent interference between the carriers. This necessitates a relatively complex design. The problem is overcome with instruments falling into the second category since light can be beamed far more accurately than microwave frequencies. Instruments falling into the second category therefore only require one carrier frequency. At the present time, however, known instruments falling into the second category have limited accuracy due to the fact that the phase comparison is carried out at relatively high frequencies.

It is an object of the present invention to provide a new method of measuring distance electronically.

It is a further object of the invention to provide apparatus falling into the abovementioned second category by means of which highly accurate measurements can be obtained.

According to the invention a method of providing a relative measure of the distance between first and second points consists in generating a first measuring frequency at the first point, modulating the first measuring frequency on a carrier frequency the wavelength of which is selected from the infra-red and shorter wavelength regions of the frequency spectrum, transmitting the modulated carrier-frequency to the second point; transmitting from the second point to the first point the same carrier frequency modulated with a second measuring frequency which is harmonically related to the first measuring frequency including the first measuring frequency itself; at the first point generating a reference frequency, demodulating the modulated carrier frequency as transmitted from the first point to extract the first measuring frequency and heterodyning this measuring frequency with the reference frequency to derive a first comparison frequency, demodulating the modulated carrier frequency as received from the second point to extract the second measuring frequency and heterodyning this measuring frequency with the reference frequency to derive a second comparison frequency, and comparing the phases of the two comparison frequencies.

Apparatus according to the invention includes, at the first point, means to generate a first measuring frequency, means to generate a carrier frequency the wavelength of which is selected from the infra-red and shorter wavelength regions of the frequency spectrum, means to modulate the first measuring frequency on the carrier frequency, and means to beam the modulated carrier frequency to the second point; means at the second point to beam to the first point the same carrier frequency modulated with a second measuring frequency which is harmonically related to the first measuring frequency including the first measuring frequency itself; at the first point, means to generate a reference frequency, means to demodulate the modulated carrier frequency as transmitted from the first point to extract the first measuring frequency and means to heterodyne this measuring frequency with the reference frequency to derive a first comparison frequency, means to demodulate the modulated carrier frequency as received from the second point to extract the second measuring frequency and means to heterodyne this measuring frequency with the reference frequency to derive a second comparison frequency, and means to compare the phases of the two comparison frequencies.

In this specification the term "transmit" or "transmitting" is intended to cover the case where a frequency is simply reflected by means of a suitable reflector.

To illustrate the invention an example thereof is described hereunder with reference to the accompanying drawing which is a block schematic diagram of distance measuring apparatus according to the invention.

In the drawing a gallium arsenide light emitting diode 10 is used to provide a carrier frequency which is in the infra-red region of the frequency spectrum. The carrier frequency is amplitude modulated with a measuring frequency obtained from an oven-controlled oscillator 11. The oscillator 11 can be switched to any one of a number of measuring frequencies, all of which are of the order of 75 mc./s.

If the instrument is to be used for measuring the distance between it and a specific point (hereinafter called the remote point), the modulated carrier is transmitted to this remote point through a folded parabolic mirror system to provide a narrow beam of infra-red radiation. At the remote point the received carrier is simply reflected back towards the instrument by means of a suitable reflector such as an optical corner reflector. A lens system 13 is provided on the instrument. The lens 13 is preferably co-axial with the mirror system 12. The reflected beam is received at the instrument and it passes through the lens system 13 to impinge on a silicon photo diode 14 which demodulates the beam to extract the measuring frequency.

A mirror is located in the transmitted beam to extract a sample of the transmitted carrier. This sample is fed to a sampling photo diode 16 which demodulates the beam to extract the measuring frequency. Thus the output of the photo diode 16 is the measuring frequency as transmitted to the remote point and the output of the photo diode 14 is the measuring frequency after its phase has been changed due to it having traversed the distance between the instrument and the remote point and back again.

The two measuring frequencies are applied to an electronic switching system 17 which is operated at a rate determined by the switch timing waveform generator 18. By means of the switching system 17 the two measuring frequencies are applied alternately to a mixer 19 through a matching circuit 20 and a radio frequency amplifier 21.

The mixer 19 is also fed with a frequency obtained from a comparison frequency reference oscillator 22, a phase discriminator 23 and a reference oscillator 24 which are all designed to ensure that the output of the mixer 19 is an accurately determined low frequency, say 10 kc./s. In order to illustrate this point let us assume that the measuring frequency in use at any specific instant is 75 mc./s. Thus the outputs of the two photo diodes 16 and 14 will be 75 mc./s. and the output of the photo diode 14 will have the required phase information.

Due to the rapid action of the switching system 17 samples of the outputs of the diodes 14 and 16 will be fed alternately to the mixer 19.

The reference oscillator 24 is designed to have as an output a frequency equal to the difference between the measuring frequency and say 10 kc./s. Thus in this example the output of the oscillator 24 would be 74.090 mc./s. This is applied to the mixer 19 and the difference frequency of 75–74.090 mc./s., namely 10 kc./s., is derived.

The output of the mixer 19 is applied to another switching system 25 which acts in synchronism with the switching system 17. Thus at one instant of time a sample of the measuring frequency from the diode 16 will be heterodyned in the mixer 19 with the reference frequency from the oscillator 24 to provide a sample of a first comparison frequency and in that same instant of time the sample of the first comparison frequency will be fed to an integrator 26. In another instant of time a sample of the measuring frequency from the diode 14 will be heterodyned in the mixer 19 with the reference frequency from the oscillator 24 to provide a sample of a second comparison frequency and in that same instant of time the sample of the second comparison frequency will be fed to a second integrator 27.

Thus the integrator 26 will receive a chopped 10 kc./s. signal which has been derived from the measuring frequency provided by the diode 16 and the integrator 27 will receive a chopped 10 kc./s. signal which has been derived from the measuring frequency provided by diode 14. The chopped signals are filtered in the integrators to provide the fundamental 10 kc./s. frequency. The output of the integrator 26 is fed through a narrow band amplifier 28 to one side of a phase measuring device consisting of the well-known phase shifter 29, phase sensitive rectifier 30 and nullmeter 31. The output of the other integrator 27 is fed through a narrow band amplifier 32 to the other side of the phase measuring device.

The phase difference between the two comparison frequencies, which is an indication of the distance between the instrument and the remote point, can thus be determined in the usual manner. In actual practice a number of measuring frequencies are modulated sequentially on to the carrier to provide fine, coarse and medium patterns. The reference oscillator 24 will then be switched in synchronism with the oscillator 11.

Due to instability in the oscillators 11 and 24 the comparison frequencies may differ from 10 kc./s. To prevent this happening a portion of the output of the amplifier 28 is fed to the discriminator 23. The comparison frequency oscillator 22 is set to 10 kc./s. and its output is also applied to the discriminator 23. If the discriminator 23 senses a difference between its two inputs it passes a control signal to the reference oscillator 24 to adjust its frequency until the heterodyne output of the mixer 19 is exactly 10 kc./s.

The choice of the carrier frequency is not critical but in order to prevent divergence of the transmitted beam and the formation of lobes at the instrument it is essential that the wavelength of the carrier frequency be 100 microns or less. As a practical matter the upper limit of the carrier frequency can be fixed at 0.1 micron.

It has been found that some transmitter modulation power is fed direct to the receiver via an electrical path, i.e. not via the reflected light path. To obtain the required accuracy of phase indication (⅓° for 1 mm. resolution) the level of such a spurious signal must be less than 0.1% of the wanted signal. This is difficult to achieve and maintain over a long period of time. However, if the spurious signal is reasonably small the effect of such an unwanted coupling can be considerably reduced as follows.

Let $\theta$ represent the delay due to the path length.
Let the unwanted signal in an arbitrary phase introduce an error of $\phi$ in the indicated phase $\psi_1$. Hence $\psi_1 = \theta - \phi$.
If the phase of the received signal is reversed without influencing the spurious signal the phase angle indicated will be:

$$\psi_2 = (\pi + \theta) + \phi$$

By adding $\psi_1$ and $\psi_2$ and subtracting $\pi$ (i.e. 50 units on a dial of 100) we get $$\psi = 2\theta$$

This is twice the true phase free from contamination error. The reversal should be achieved before any contamination takes place.

The reversal is effected by means of the switch 33.

I claim:

1. A method of providing a relative measure of the distance between first and second spaced points, comprising generating a measuring frequency at the first point, modulating the measuring frequency on a carrier frequency the wavelength of which lies in the range 100 to 0.1 microns, transmitting the modulated carrier frequency to the second point; transmitting from the second point to the first point the same modulated carrier frequency; at the first point generating a reference frequency, demodulating the modulated carrier frequency as transmitted from the first point to extract the measuring frequency and heterodyning this measuring frequency with the reference frequency to derive a first comparison frequency, demodulating the modulated carrier frequency as received from the second point to extract the measuring frequency and heterodyning this measuring frequency with the reference frequency to derive a second comparison frequency, and comparing the phases of the first and second comparison frequencies.

2. A method as claimed in claim 1 in which the measuring frequency is amplitude modulated on its carrier frequency.

3. A method as claimed in claim 1 in which the modulated carrier frequency as received at the second is simply reflected back towards the first point.

4. A method as claimed in claim 1 in which the reference frequency is so controlled that the difference between the reference frequency and the measuring frequency is always a prescribed comparison frequency.

5. A method as claimed in claim 1 in which the measuring frequency is switched to any one of a number of prescribed frequencies.

6. A method as claimed in claim 1 in which at the first point the extracted measuring frequencies are fed alternately through a common amplifier and mixer system.

7. A method of providing a relative measure of the distance between first and second spaced points, comprising generating a measuring frequency at the first point, modulating the measuring frequency on a carrier frequency the wavelength of which lies in the range 100 to 0.1 microns, transmitting the modulated carrier frequency to the second point; at the second point reflecting the received modulated carrier frequency back towards the first point; at the first point generating a reference frequency, demodulating the modulated carrier frequency as transmitted from the first point to extract the measuring frequency and heterodyning this measuring frequency with the reference frequency to derive a first comparison frequency, demodulating the modulated carrier frequency as received from the second point to extract the measuring frequency and heterodyning this measuring frequency with the reference frequency to derive a second comparison frequency, and comparing the phases of the first and second comparison frequencies.

8. A method as claimed in claim 7, in which the measuring frequency is amplitude modulated on the carrier frequency.

9. A method as claimed in claim 7, in which the reference frequency is so controlled that the difference between the reference frequency and the measuring frequency is always a prescribed comparison frequency.

10. A method as claimed in claim 7, in which the measuring frequency is switched to any one of a number of prescribed frequencies.

11. A method as claimed in claim 7, in which at the first point the extracted measuring frequencies are fed alternately through a common amplifier and mixer system.

12. Apparatus for providing a relative measure of the distance between first and second spaced points, comprising means to generate a measuring frequency, means to generate a carrier frequency the wavelength of which lies in the range 100 to 0.1 microns, means to modulate the measuring frequency on the carrier frequency, and means to beam the modulated carrier frequency to the second point; means at the second point to beam to the first point the same modulated carrier frequency at the first point, means to generate a reference frequency, means to demodulate the modulated carrier frequency as transmitted from the first point to extract the measuring frequency and means to heterodyne this measuring frequency with the reference frequency to derive a first comparison frequency, means to demodulate the modulate carrier frequency as received from the second point to extract the measuring frequency and means to heterodyne this measuring frequency with the reference frequency to derive a second comparison frequency, and means to compare the phases of the two comparison frequencies.

13. Apparatus as claimed in claim 12, in which the means to generate the carrier frequency is a gallium arsenide light emitting diode.

14. Apparatus as claimed in claim 12 including a photo diode at the first point which is located to extract a sample of the modulation on the modulated carrier frequency being transmitted to the second point, from which sample the first comparison frequency is derived.

15. Apparatus as claimed in claim 12 including a common amplifier and mixer system through which the extracted measuring frequencies are fed alternately.

16. Apparatus for providing a relative measure of the distance between first and second spaced points, comprising at the first point, means to generate a measuring frequency, means to generate a carrier frequency the wavelength of which lies in the range 100 to 0.1 microns, means to modulate the measuring frequency on the carrier frequency, and means to beam the modulated carrier frequency to the second point; at the second point means to reflect the received modulated carrier frequency back towards the first point; at the first point, means to generate a reference frequency, means to demodulate the modulated carrier frequency as transmitted to the second point to extract the measuring frequency and means to heterodyne this measuring frequency with the reference frequency to derive a first comparison frequency, means to demodulate the modulated carrier frequency as received from the second point to extract the measuring frequency and means to heterodyne this measuring frequency with the reference frequency to derive a second comparison frequency, and means to compare the phases of the first and second comparison frequencies.

References Cited
UNITED STATES PATENTS

| 2,907,999 | 10/1959 | Wadley | 343—12 |
| 3,241,139 | 3/1966 | Wadley | 343—12 |
| 3,300,780 | 1/1967 | Mason | 343—12 |

RICHARD A. FARLEY, *Primary Examiner.*

RODNEY D. BENNETT, *Examiner.*

J. P. MORRIS, *Assistant Examiner.*

Disclaimer 3,365,717.—*Hobbe D. Hölscher*, Johannesburg, Transvaal, Republic of South Africa. METHOD OF AND APPARATUS FOR PROVIDING A MEASURE OF THE DISTANCE BETWEEN TWO SPACED POINTS. Patent dated Jan. 23, 1968. Disclaimer filed Aug. 30, 1971, by the assignee, *South African Inventions Development Corporation*.

Hereby enters this disclaimer to claims 1–5, 7–10, 12, 14 and 16 of said patent.

[*Official Gazette December 14, 1971.*]